US011824160B2

(12) United States Patent
Dahn et al.

(10) Patent No.: US 11,824,160 B2
(45) Date of Patent: Nov. 21, 2023

(54) BATTERY SYSTEMS BASED ON TWO-ADDITIVE ELECTROLYTE SYSTEMS INCLUDING 2-FURANONE, AND METHOD OF FORMATION PROCESS OF SAME

(71) Applicant: Tesla Motors Canada ULC, North York (CA)

(72) Inventors: Jeffery Raymond Dahn, Halifax (CA); Xiaowei Ma, Halifax (CA)

(73) Assignees: Tesla, Inc., Austin, TX (US); Panasonic Holdings Corporation, Osaka (JP)

( * ) Notice: Subject to any disclaimer, the term of this patent is extended or adjusted under 35 U.S.C. 154(b) by 0 days.

(21) Appl. No.: 16/028,041

(22) Filed: Jul. 5, 2018

(65) Prior Publication Data

US 2019/0280333 A1  Sep. 12, 2019

Related U.S. Application Data

(60) Provisional application No. 62/641,953, filed on Mar. 12, 2018.

(51) Int. Cl.
*H01M 10/0567* (2010.01)
*H01M 10/0525* (2010.01)
(Continued)

(52) U.S. Cl.
CPC ....... *H01M 10/0567* (2013.01); *H01M 4/364* (2013.01); *H01M 4/505* (2013.01);
(Continued)

(58) Field of Classification Search
CPC ......... H01M 10/0567; H01M 10/0569; H01M 10/446; H01M 2300/0037; H01M 2300/004
See application file for complete search history.

(56) References Cited

U.S. PATENT DOCUMENTS

2009/0226820 A1    9/2009  Jeon et al.
2011/0014504 A1*   1/2011  Onuki ............... H01M 10/4235
                                                          429/50
(Continued)

FOREIGN PATENT DOCUMENTS

CN    103367800    10/2013
JP    2002-075445   3/2002
(Continued)

OTHER PUBLICATIONS

PCT International Search Report and Written Opinion for related PCT/CA2018/00164 dated Nov. 16, 2018.
(Continued)

*Primary Examiner* — Brian R Ohara
*Assistant Examiner* — Brent C Thomas
(74) *Attorney, Agent, or Firm* — Knobbe Martens Olson & Bear, LLP

(57) ABSTRACT

Improved battery systems have been developed for lithium-ion based batteries. The improved battery systems consist of two-additive mixtures in an electrolyte solvent. Such battery systems are prepared by assembling a positive electrode and a negative electrode in the sealed cell, removing residual water from the sealed cell, filling the sealed cell with a nonaqueous electrolyte under an inert atmosphere, vacuum-sealing the sealed cell, carrying out a formation process comprising charging and discharging the sealed cell until the sealed cell achieves an initial capacity. The nonaqueous electrolyte includes lithium ions, a first nonaqueous solvent comprising a carbonate solvent, a second nonaqueous solvent comprising methyl acetate, and an additive mixture of a first operative additive of either vinylene carbonate or fluoroethylene carbonate and a second operative additive of 2-furanone. Gas formation is suppressed in the battery system during the formation process.

16 Claims, 13 Drawing Sheets

(51) Int. Cl.
  *H01M 10/058* (2010.01)
  *H01M 10/0569* (2010.01)
  *H01M 4/505* (2010.01)
  *H01M 4/525* (2010.01)
  *H01M 4/587* (2010.01)
  *H01M 4/36* (2006.01)

(52) U.S. Cl.
  CPC ........... *H01M 4/525* (2013.01); *H01M 4/587* (2013.01); *H01M 10/058* (2013.01); *H01M 10/0525* (2013.01); *H01M 10/0569* (2013.01); *H01M 2300/004* (2013.01); *H01M 2300/0037* (2013.01)

(56) References Cited

U.S. PATENT DOCUMENTS

| | | | |
|---|---|---|---|
| 2011/0309306 A1* | 12/2011 | Zhou | B82Y 40/00 252/500 |
| 2014/0302402 A1 | 10/2014 | Chen et al. | |
| 2015/0249271 A1* | 9/2015 | Choi | H01M 10/0569 429/332 |
| 2017/0025706 A1 | 1/2017 | Dahn et al. | |
| 2017/0117586 A1 | 4/2017 | Dubois et al. | |
| 2017/0162906 A1* | 6/2017 | Nakazawa | H01M 10/0569 |
| 2018/0205069 A1* | 7/2018 | Lee | H01M 4/139 |
| 2019/0058221 A1* | 2/2019 | Burkhardt | H01M 10/0525 |

FOREIGN PATENT DOCUMENTS

| | | |
|---|---|---|
| JP | 2005-285504 | 10/2005 |
| JP | 2005-340151 | 12/2005 |
| JP | 2006-318760 | 11/2006 |
| JP | 2008-159419 | 7/2008 |
| KR | 20080065561 | 7/2008 |
| WO | WO 2017/074556 A1 | 5/2017 |

OTHER PUBLICATIONS

Lee et al., "Quantitative and qualitative study on the solid electrolyte interface formed by 2-(5H) furanone: a novel additive for propylene carbonate-based lithium-ion battery electrolyes", Electrochimica Acta, vol. 265 (Mar. 1, 2018), pp. 662-669.

* cited by examiner

BATTERY SYSTEMS BASED ON TWO-ADDITIVE ELECTROLYTE SYSTEMS INCLUDING 2-FURANONE, AND METHOD OF FORMATION PROCESS OF SAME

RELATED APPLICATION DATA

This application claims the benefit of priority to U.S. Patent Application No. 62/641,953 filed Mar. 12, 2018, the entirety of which is incorporated herein by reference to the extent permitted by law.

TECHNICAL FIELD

The present disclosure relates to rechargeable battery systems, and more specifically to the chemistry of such systems, including operative, electrolyte additives and electrodes, for improving the properties of the rechargeable lithium-ion-battery systems. The present disclosure also relates to the fabrication of rechargeable battery cells, and more specifically, to the post-assembly formation, and testing process of rechargeable battery cells.

BACKGROUND

Rechargeable batteries are an integral component of energy-storage systems for electric vehicles and for grid storage (for example, for backup power during a power outage, as part of a microgrid, etc.). Depending on the application, the energy-storage systems require different properties. Tradeoffs in the chemistry of a battery system may need to be made to create a suitable system for a particular application. For example, in automobile applications—particularly those in an electric vehicle—the ability to charge and discharge quickly is an important property of the system. An electric vehicle owner may need to quickly accelerate in traffic, which requires the ability to quickly discharge the system. Further, fast charging and discharging places demands on the system, so the components of the system may also need to be chosen to provide sufficient lifetime under such operation conditions.

The first charge and discharge of a Li-ion cell is done in the factory by the manufacturer. This is called the "formation process." The formation process can result in the creation of a solid-electrolyte-interface (SEI) layer on the anode, which serves as a passivation layer essential for moderating the charging process under normal use. This formation charge/discharge process can help identify cells that do not meet the quality standard before they are placed in a battery pack. In addition, it is important to minimize gas generation during the formation process which can lead to process simplicity.

Furthermore, during the formation process, information on cell performance, such as cell capacity, open-circuit voltage (OCV) after formation, direct-current resistance (DCR), capacitance, and impedance, can be collected for quality analysis. The spread of the performance measurements can also indicate whether the formation process and the upstream cell manufacturing process are under control.

For high throughput manufacturing, a large number of cells can be placed in the formation process together, typically in a conveyance tray. Conventional high-volume formation facilities typically consist of power supply and control modules coupled to battery contact fixtures, which hold the tray of cells and facilitate electrical connection to the individually controlled cells. Such systems often require a large number of cables (typically four or more wires per battery cell), take up a significant amount of space, and can be energy inefficient. As a result, the inefficiency from the power electronics and long cables can result in heat rejection to the room, which often requires large ducted air cooling systems and could lead to variations in the cell temperature, thereby increasing the chance of error in the formation process. In addition, the existing formation facilities are typically designed without full consideration and optimization of the support systems.

Moreover, electrolyte additives have been shown to be operative and increase the lifetime and performance of Li-ion-based batteries. For example, in J. C. Burns et al., *Journal of the Electrochemical Society,* 160, A1451 (2013), five proprietary, undisclosed electrolyte additives were shown to increase cycle life compared to an electrolyte system with no or only one additive. Other studies have focused on performance gains from electrolyte systems containing three or four additives as described in U.S. 2017/0025706. However, researchers typically do not understand the interaction between different additives that allow them to work together synergistically with the electrolyte and specific positive and negative electrodes. Thus, the identity of certain systems is often based on trial and error and cannot be predicted beforehand.

Prior studies have not identified two-additive electrolyte systems that can be combined into a lithium-ion battery system to yield a robust system with sufficient properties for grid or automobile applications. As discussed in U.S. 2017/0025706, two-additive systems studied (for example, 2% VC+1% allyl methanesulfonate and 2% PES+1% TTSPi) typically performed worse than the three- and four-additive electrolyte systems. (See, e.g., U.S. 2017/0025706 at Tables 1 and 2.) U.S. 2017/0025706 discloses that a third compound, often tris(-trimethly-silyl)-phosphate (TTSP) or tris(-trimethyl-silyl)-phosphite (TTSPi), was necessary in concentrations of between 0.25-3 wt % to produce a robust lithium-ion-battery system. (See, e.g., U.S. 2017/0025706 at ¶72.) However, because additives can be expensive and difficult to include within Li-ion batteries on a manufacturing scale, more simple, yet effective battery systems are needed, including those with fewer additives.

Definitions

"Cell" or "battery cell" generally refers to an electrochemical cell, which is a device capable of generating electrical energy from chemical reactions or facilitating chemical reactions through the introduction of electrical energy. A battery can contain one or more cells.

"Rechargeable battery" generally refers a type of electrical battery which can be charged, discharged into a load, and recharged a number of times. In this disclosure, a number of examples are described based on Li-ion rechargeable batteries. Nevertheless, embodiments of the present invention are not limited to one type of rechargeable battery, and can be applied in conjunction with various rechargeable battery technologies.

SUMMARY

This disclosure covers novel battery systems with fewer operative, electrolyte additives that may be used in different energy storage applications, for example, in vehicle and grid-storage. More specifically, this disclosure includes two-additive electrolyte systems that reduce the amount of gas generated during the formation process, enhance performance and lifetime of Li-ion batteries, while reducing costs from other systems that rely on more additives. This disclosure also discloses effective positive electrodes and negative electrodes that work with the disclosed two-additive electrolyte systems to provide further systematic enhancements.

Two-operative, additive electrolyte systems are disclosed including vinylene carbonate (VC) combined with 2-furanone (FN). FN has the following formula (I):

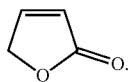

(I)

Also disclosed is fluoro ethylene carbonate (FEC) combined with FN.

Because VC and FEC provide similar improvements (and are believed to function similarly), a mixture of VC and FEC may be considered as only a single operative electrolyte. That is, another disclosed two-operative, additive electrolyte system includes a mixture of VC and FEC combined with FN. When used as part of a greater battery system (which includes the electrolyte, electrolyte solvent, positive electrode, and negative electrode), these two-operative, additive electrolyte systems produce desirable properties for energy storage applications, including in vehicle and grid applications.

More specifically, lithium nickel manganese cobalt oxide (NMC) positive electrodes, a graphite negative electrodes, a lithium salt dissolved in an organic or non-aqueous solvent, and two additives to form a battery system with desirable properties for different applications. The electrolyte solvent may be the following solvents alone or in combination: ethylene carbonate (EC), ethyl methyl carbonate (EMC), methyl acetate, propylene carbonate, dimethyl carbonate, diethyl carbonate, another carbonate solvent (cyclic or acyclic), another organic solvent, and/or another non-aqueous solvent. Solvents are present in concentrations greater than the additives, typically greater than 6% by weight. The solvent may be combined with the disclosed two-additive pairs (such as VC with FN, FEC with FN, a mixture of VC and FEC with FN, or another combination) to form a battery system with desirable properties for different applications. The positive electrode may be coated with a material such as aluminum oxide ($Al_2O_3$), titanium dioxide ($TiO_2$), or another coating. Further, as a cost savings, the negative electrode may be formed from natural graphite, however depending on the pricing structure, in certain instances artificial graphite is cheaper than natural graphite.

The disclosure herein is supported by experimental data that shows the symbiotic nature of the two-additive electrolyte systems and selected electrodes. Exemplary battery systems include two additives (for example, FEC or VC, FN, a graphite negative electrode (either naturally occurring graphite or an artificial, synthetic graphite), an NMC positive electrode, a lithium electrolyte (formed from, for example, a lithium salt such as lithium hexafluorophosphate with chemical composition $LiPF_6$), and an organic or non-aqueous solvent.

An exemplary embodiment of the application is a method of preparing a battery system comprising a sealed cell, the method comprising: assembling a positive electrode and a negative electrode in the sealed cell; removing residual water from the sealed cell; filling the sealed cell with a nonaqueous electrolyte under an inert atmosphere; vacuum-sealing the sealed cell; carrying out a formation process comprising charging and discharging the sealed cell until the sealed cell achieves an initial capacity, wherein the nonaqueous electrolyte comprises: lithium ions; a first nonaqueous solvent comprising a carbonate solvent; a second nonaquaeous solvent comprising methyl acetate; and an additive mixture of a first operative additive of either vinylene carbonate or fluoroethylene carbonate and a second operative additive of 2-furanone having the following formula (I):

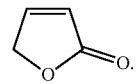

(I)

In some embodiments, this electrolyte formulation assists in suppression of gas formation in the battery system during the formation process.

In some embodiments, substantially all residual water is removed. In some embodiments, all residual water is removed.

In some embodiments, the initial capacity is a specified upper cutoff potential.

In another exemplary embodiment, the method does not include a gas release step after the formation process.

In another exemplary embodiment, gas generation during the formation process is suppressed by at least 50% compared with gas generation during a formation process of a battery system comprising only the first operative additive.

In another exemplary embodiment, the formation process comprises charging the sealed cell at 11 mA, in this case corresponding to C/20, (C/x) to 4.2V and discharging to 3.8V, wherein C/x indicates the time to charge or discharge the cell at the current selected is x hours when the cell has its initial capacity.

In another exemplary aspect, removing residual water from the sealed cell comprises opening the sealed cell below a heat seal and drying at 100° C. under vacuum for 12 hours.

In another exemplary embodiment, gas generation is completely suppressed during the formation process.

In another exemplary embodiment, the battery system has a capacity retention comparable to a battery system comprising only the first operative additive.

In another exemplary embodiment, a concentration of the first operative additive is in a range from 0.25 to 6% by weight.

In another exemplary embodiment, the concentration of the second operative additive is in a range from 0.1 to 5% by weight.

In another exemplary embodiment, the concentration of the first operative additive is 2% by weight, and the concentration of the second operative additive is from 0.5% to 1% by weight.

In another exemplary embodiment, the first operative additive is fluoroethylene carbonate.

In another exemplary embodiment, the first operative additive is vinylene carbonate.

In another exemplary embodiment, the nonaqueous solvent is a carbonate solvent.

In another exemplary embodiment, the nonaqueous solvent is at least one selected from ethylene carbonate, ethyl methyl carbonate and dimethyl carbonate.

In another exemplary embodiment, the solvent further comprises a second nonaqueous solvent.

In another exemplary embodiment, the second nonaqueous solvent is methyl acetate.

In another exemplary embodiment, the positive electrode is selected from NMC532 with micrometer-sized grains, standard NMC532 and NMC622.

In another exemplary embodiment, the negative electrode is selected from artificial graphite and natural graphite.

BRIEF DESCRIPTION OF THE DRAWINGS

FIG. 5A illustrates the charging profile and gas formation of an electrolyte composition comprising 2% FEC as a first electrolyte additive.

FIG. 5B illustrates the charging profile and gas formation of an electrolyte composition comprising 2% FEC as a first electrolyte additive and 0.5% FN as a second electrolyte additive.

FIG. 5C illustrate the charging profile and gas formation of an electrolyte composition comprising 2% FEC as a first electrolyte additive and 1% FN as a second electrolyte additive.

FIG. 6A illustrates the passivation impact of ethylene carbonate (EC):ethyl methyl carbonate (EMC) (control), and EC:EMC with 2% VC, 0.5% FN, 1% FN, 2% VC+1% FN, 2% FEC+1% FN, and 1% LFO (LiPO$_2$F$_2$)+1% FN in a cell with a coated NMC532 positive electrode and an artificial graphite negative electrode.

FIG. 6B illustrates the passivation impact of ethylene carbonate (EC):ethyl methyl carbonate (EMC) (control), and EC:EMC with 2% VC, 0.5% FN, 1% FN, 2% VC+1% FN, and 2% FEC+1% FN in a Panasonic 1030 cell (Li[Ni$_{1-x-y}$Co$_x$Al$_y$]O$_2$/Graphite-SiO (NCA) pouch cells) was used. LiNi$_x$Co$_y$Al$_z$O$_2$ is abbreviated herein as NCA generally or NCAx:y:z where the x, y, and z are the molar ratios of nickel, cobalt and aluminum respectively, and x+y+z=100.

FIG. 7A illustrates the EIS spectra of, and gas formation in, electrolyte compositions comprising 2% VC, 2% FEC, 1% LFO, 0.5% FN, 1% FN, 2% VC+1% FN, 2% FEC+1% FN, and 1% LFO+1% FN in a cell with a coated NMC532 positive electrode and an artificial graphite negative electrode.

FIG. 7B illustrates the EIS spectra of, and gas formation in, electrolyte compositions comprising 2% VC, 0.5% FN, 1% FN, 2% VC+1% FN, and 2% FEC+1% FN in a Panasonic 1030 cell.

FIG. 8A illustrates the discharge capacity, normalized capacity and voltage hysterisis for electrolyte systems including 2% VC, 2% FEC, 0.5% FN and 1% FN in a cell comprising a coated NMC532 positive electrode and an artificial graphite negative electrode.

FIG. 8B illustrates the discharge capacity, normalized capacity and voltage hysterisis for electrolyte systems including 2% VC, 2% FEC, 2% VC+1% FN and 2% FEC+1% FN in a cell comprising a coated NMC532 positive electrode and an artificial graphite negative electrode.

FIG. 8C illustrates the discharge capacity, normalized capacity and voltage hysterisis for electrolyte systems including 1% LFO and 1% LFO+1% FN in a cell comprising a coated NMC532 positive electrode and an artificial graphite negative electrode.

FIG. 8D illustrates the discharge capacity, normalized capacity and voltage hysterisis for electrolyte systems including EC:EMC:DMC electrolyte with 2% VC, 2% FEC, 0.5% FN and 1% FN as additives in a Panasonic 1030 cell.

FIG. 8E illustrates the discharge capacity, normalized capacity and voltage hysterisis for electrolyte systems including EC:EMC:DMC electrolyte with 2% VC+1% FN, 2% FEC+1% FN, 2% VC, and 2% FEC in a Panasonic 1030 cell.

DETAILED DESCRIPTION OF THE DISCLOSURE

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Figure 1:
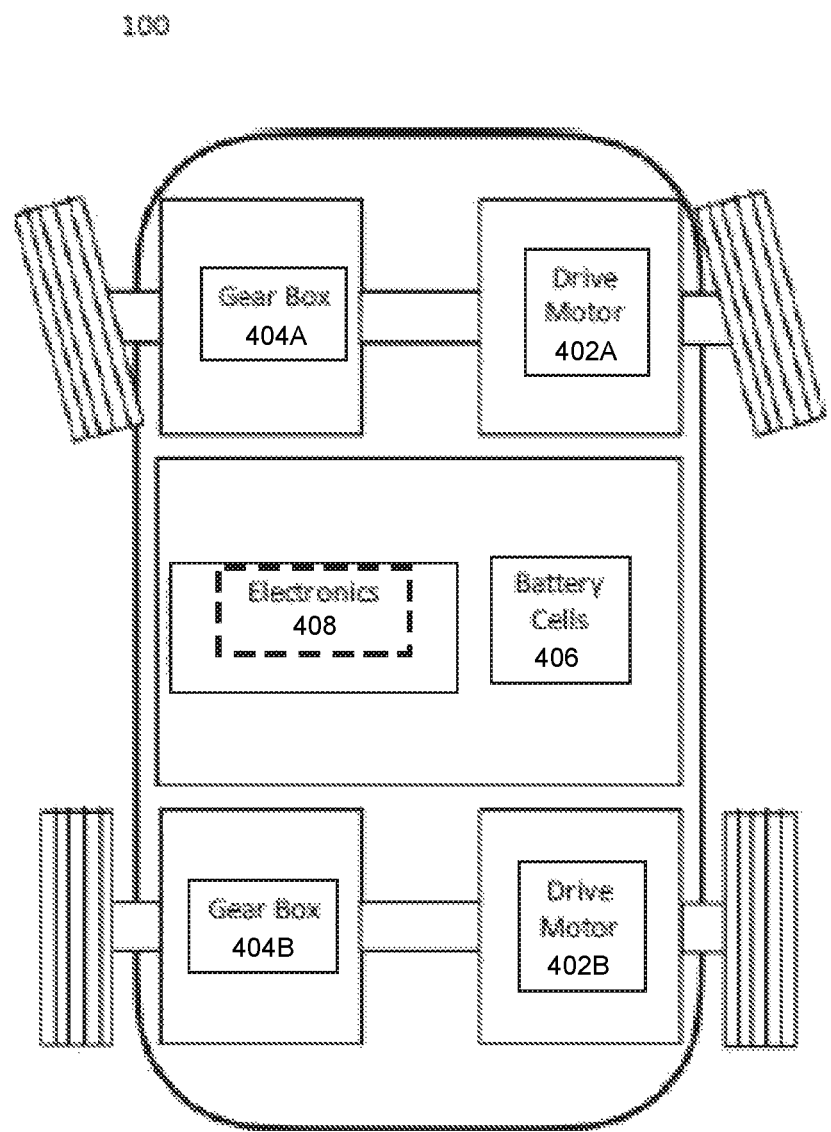
FIG. 1 is a schematic diagram of a vehicle containing a battery storage system.

FIG. 1 illustrates the basic components of a battery powered electric vehicle (electric vehicle) 100. The electric vehicle 100 includes at least one drive motor (traction motor) 402A and/or 402B, at least one gear box 404A and/or 404B coupled to a corresponding drive motor 402A and/or 402B, battery cells 406 and electronics 408. Generally, the battery cells 406 provide electricity to power electronics of the electric vehicle 100 and to propel the electric vehicle 100 using the drive motor 402A and/or 402B. The electric vehicle 100 includes a large number of other components that are not described herein but known to one or ordinary skill. While the construct of the electric vehicle 100 of FIG. 1 is shown to have four wheels, differing electric vehicles may have fewer or more than four wheels. Further, differing types of electric vehicles 100 may incorporate the inventive concepts described herein, including motor cycles, aircraft, trucks, boats, train engines, among other types of vehicles. Certain parts created using embodiments of the present disclosure may be used in vehicle 100.

Figure 2:
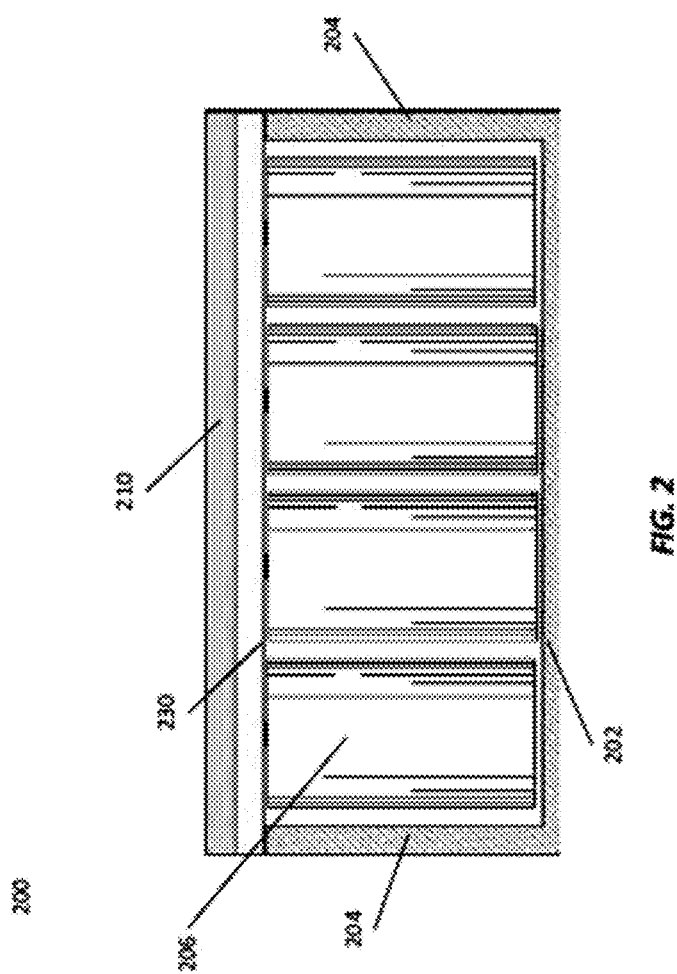
FIG. 2 is a schematic diagram of an exemplary battery storage system.

FIG. 2 illustrates a schematic view of an exemplary energy storage system 200 showing various components. The energy storage system 200 typically includes a modular housing with at least a base 202 and four side walls 204 (only two shown in the figure). The module housing is generally electrically isolated from the housed battery cells 206. This may occur through physical separation, through an electrically insulating layer, through the choice of an insulating material as the module housing, any combination thereof, or another through another method. The base 202 may be an electrically insulating layer on top of a metal sheet or a nonconductive/electrically insulating material, such as polypropylene, polyurethane, polyvinyl chloride, another plastic, a nonconductive composite, or an insulated carbon fiber. Side walls 204 may also contain an insulating layer or be formed out of a nonconductive or electrically insulating material, such as polypropylene, polyurethane, polyvinyl chloride, another plastic, a nonconductive composite, or an insulated carbon fiber. One or more interconnect layers 230 may be positioned above the battery cells 206, with a top plate 210 positioned over the interconnect layer 230. The top plate 210 may either be a single plate or be formed from multiple plates. Individual battery cells 106 and 206 often are lithium-ion battery cells, with an electrolyte containing lithium ions and positive and negative electrodes.

Figure 3:
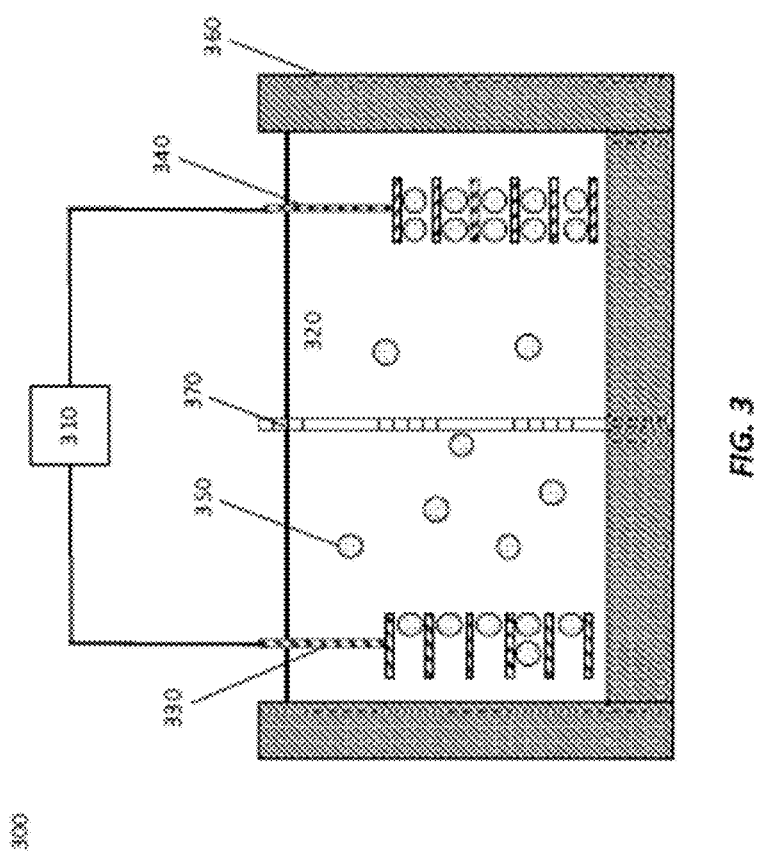
FIG. 3 is a schematic diagram of a lithium-ion, battery-cell system.

FIG. 3 illustrates a schematic of a lithium ion cell 300. Lithium ions 350 are dispersed throughout electrolyte 320, within container 360. Container 360 may be part of a battery cell. The lithium ions 350 migrate between positive electrode 330 and negative electrode 340. Separator 370 separates the negative electrode and positive electrode. Circuitry 310 connects the negative electrode and positive electrode.

Figure 4:
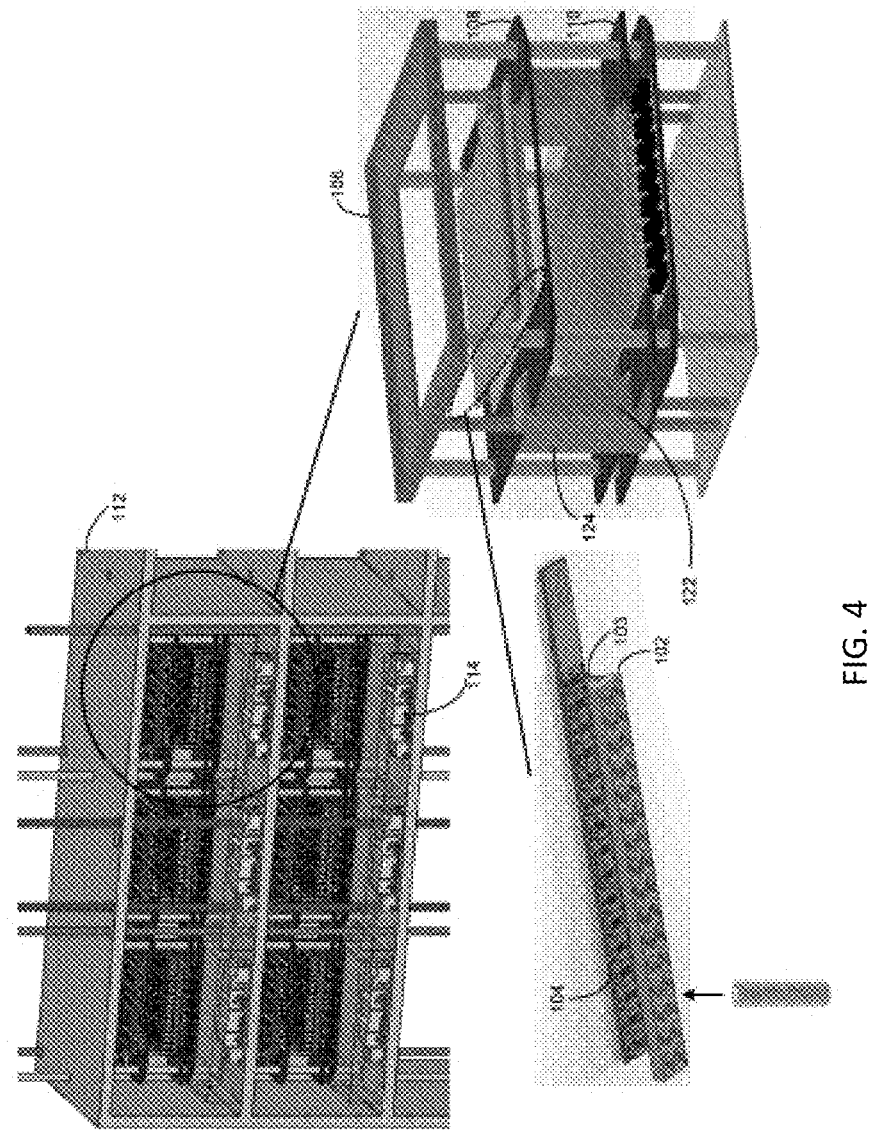
FIG. 4 illustrates an exemplary configuration of an electrical circuit module and a contact module for cell formation, according to one embodiment of the present invention.

FIG. 4 shows an exemplary configuration of an electrical circuit module and a contact module for cell formation, according to one embodiment of the present invention. In this example, contact module 102 and electrical circuit module 104 are positioned adjacent to each other. A cell undergoing formation charge/discharge cycling can be placed in contact with the contact pins in one of the receptacles on contact module 102. Circuit module 104 can accommodate a number of electrical circuits, each corresponding to a receptacle on contact module 102 for accommodating a cell. Each cell-specific circuit can be configured to supply well-controlled voltage to the cell housed in the receptacle, and collect measurements for the cell. Note that this compact configuration of contact module 102 and circuit module 104, which jointly form a cell interface block, can eliminate the need for a large amount of cabling, as is the case in a conventional formation system. A large amount of cabling can be expensive, take up space, require long installation/repair time, can be a source of inefficiency, and can lead to less accuracy.

Note that since contact module 102 can contain multiple pogo pins in the receptacle, contact module 102 can also be referred to as a "pogo board." In one embodiment, contact module 102 and circuit module 104 can be attached together with spacers 103, so that the two modules can form one rigid entity. In addition, contact module 102 can provide 32 receptacles to accommodate 32 cells at once. Other numbers of receptacles are also possible.

To facilitate scalable and automatic operation, the contact-module/circuit-module combination can be attached to a top platform 108, and the cells undergoing formation can be held on a bottom platform 110. Both top platform 108 and bottom platform 110 can be housed in a frame 106. In one embodiment, top platform 108 and bottom platform 110 can be actuated to move vertically in a "clamshell" manner. Specifically, actuator 122 can move bottom platform 110 upward, and actuator 124 can move top platform downward. Frame 106 can therefore be referred to as a "clamshell structure." After cells are placed on bottom platform 110, top platform 108 and bottom platform 110 can be actuated to move toward each other, so that the top of the cells can be in contact with the pins positioned inside each receptacle in the cell contact module (similar to contact module 102). It is also possible to fix the vertical position of bottom platform 110 and only move top platform 108 downward to contact the cells, or vice versa. Note that this one-sided actuation configuration has certain advantages. It can eliminate the complexity in the clamping fixture by using only one set of actuation mechanism and can reduce the overall space required for the clamping fixture by approximately one third. Furthermore, the top-only cell connection configuration can eliminate cables to the bottom of the cells, which also results in the aforementioned benefits. The contact and circuit modules also help eliminate the need for a separate power electronics module and long cable runs.

In the example shown in FIG. 4, clamshell structure 106 can accommodate eight cell interface blocks (each containing a contact module and a circuit module), wherein each block can accommodate 32 cells. Therefore, the entire clamshell structure can process 32×8=256 cells simultaneously. Other numbers of cells per block and numbers of blocks are also possible. Such dense packing of the cells can lower the per-cell operational efficiency (operational expenditure, OPEX) and total CAPEX, which would not be attainable in a conventional formation system where the contact board and the power supply and control modules are separate from each other, which requires complex and space-consuming cabling to connect the two.

To further improve the cell-packing density, a number of clamshell structures, such as structure 106 can be housed in a larger rack, such as rack 112. In this example rack 112 can accommodate seven clamshell structures, bringing the total number of cells undergoing formation to 1792. Other numbers of clamshell structures are also possible. Note that bulky electrical components, such as system control and AC/DC power conversion module 114, can be provisioned on a per-clamshell-structure basis and be placed in the vicinity of each clamshell structure. In further embodiments, the AC/DC power conversion module can be provisioned in a centralized manner on a per-rack basis.

New studies by the inventors have identified novel electrolyte and battery systems for use in grid and electric vehicle applications. These systems are based on two-additive electrolyte systems combined with solvents and electrodes, including vinylene carbonate (VC) combined with 2-furanone (FN), and fluoroethylene carbonate (FEC) combined with FN. These two-additive electrolyte systems are paired with a positive electrode made from lithium nickel manganese cobalt oxide with the composition $LNi_xMn_yCo_zO_2$ (abbreviated NMC generally or NMCxyz where the x, y, and z are the molar ratios of nickel, manganese and cobalt respectively, and x+y+z=1). In addition these additives can be paired with $LiNi_xCo_yAl_zO_2$ (abbreviated NCA generally or NCAx:y:z) where the x, y, and z are the molar ratios of nickel, cobalt and aluminum respectively, and x+y+z=100. In certain embodiments, the positive electrode is formed from NMC111, NMC532, NMC811, NMC622, NCA90:05:05, or is like that found in the Panasonic 1030 cell. In certain embodiments, NMC532 positive electrodes formed from single-crystal, micrometer-side particles, which resulted in an electrode with micrometer-size areas of continuous crystal lattice (or grains), have been shown to be particularly robust, in part because the materials and processing conditions result in larger grain sizes than using conventional materials and processing conditions.

Typical processing conditions lead to NMC electrodes with nanometer-sized particles packed into larger micrometer-sized agglomerates, creating grain boundaries on the nanometer scale. Grain boundaries are defects that tend to reduce desirable properties (for example, electrical properties), so it is typically desirable to reduce the number of grains and increase the grain size. Processing can create larger domains, on the micrometer size scale, thereby reducing the number of grain boundaries in the NMC electrodes, increasing electrical properties. The increase in properties is results in more robust battery systems. In certain embodiments, other NMC electrodes may be processed to create larger domain sizes (on the micrometer-size scale or larger), for example, NMC111, NMC811, NMC622, or another NMC compound to create more robust systems.

The positive electrode may be coated with a material such as aluminum oxide ($Al_2O_3$), titanium dioxide ($TiO_2$), or another coating. Coating the positive electrode is advantageous because it can help reduce interfacial phenomena at the positive electrode, such as parasitic reactions, thermal abuse, or another phenomenon, that can deteriorate the system. The negative electrode may be made from natural graphite, artificial graphite, graphite/SiO blends, or another material.

The electrolyte may be a lithium salt dissolved (such as $LiPF_6$) in a combination of organic or non-aqueous solvents, including ethylene carbonate (EC), ethyl methyl carbonate (EMC), methyl acetate (MA), propylene carbonate, dimethyl carbonate (DMC), diethyl carbonate, another carbonate solvent (cyclic or acyclic), another organic solvent, and/or another non-aqueous solvent. Solvents are present in concentrations greater than the additives, typically greater than or equal to about 5% by weight, or greater than or equal to about 6% by weight. While the experimental data for the NMC/graphite cells was generated using an electrolyte solvent that included EC and EMC (with or without DMC and/or MA), these solvents are merely exemplary of other carbonate solvents in particular and to other non-aqueous solvents. EC and EMC solvents were used in the experiments to control the systems tested in order to understand the effects of the additives, electrodes. Electrolyte systems may therefore may use other carbonate solvents and/or other non-carbonate solvents, including propylene carbonate, ethylene carbonate, dimethyl carbonate, ethyl methyl carbonate, diethyl carbonate, another carbonate solvent (cyclic or acyclic), another organic solvent, and/or another non-aqueous solvent. Solvents are present in concentrations greater than the additives, typically greater than 5% or 6% by weight.

In the two-additive mixture FEC and FN, the concentration of FEC is preferentially between 0.5 to 6% by weight and the concentration of the FN is preferentially between 0.25 to 5% by weight. In the two-additive mixture VC and FN, the concentration of VC is preferentially between 0.5 to 6% by weight and the concentration of the FN is preferentially between 0.1 and 5% by weight, 0.15 and 5% by weight, 0.2 and 5% by weight, and 0.25 to 5% by weight.

Certain of these new battery systems may be used in energy-storage applications and also automobile application (including energy storage within an electric vehicle) in which charge and discharge speeds, and lifetime when charging and discharging quickly are important.

Pre-Experimental Setup

Although the battery systems themselves may be packaged differently according to the present disclosure, the experimental setup typically used machine made "sealed cells" to systematically evaluate the battery systems using a common setup, including the two-additive electrolyte systems and the specific materials for use the positive and negative electrodes. All percentages mentioned within this disclosure are weight percentages unless otherwise specified. A person of skill in the art will appreciate that the type of additive to be used and the concentration to be employed will depend on the characteristics which are most desirably improved and the other components and design used in the lithium ion batteries to be made and will be apartment from this disclosure.

Sealed Cells

The NMC/graphite sealed cells used in the experimental setup contained 1 M $LiPF_6$ in the solvent to which additives were added. The electrolyte consisted of 1 M $LiPF_6$ in 1.2M $LiPF_6$ in 30% EC and 70% EMC. The concentration of the electrolyte components may be modified to include MA and/or DMC. To this electrolyte, the additive components were added at specified weight percentages.

The Panasonic 1030 sealed cells (Li[Ni1-x-yCoxAly]O2/Graphite-SiO (NCA) pouch cells) used in the experimental setup contained an electrolyte solvent that consisted of 1.2 M LiPF6 added to EC, EMC and DMC in volume ratios of 25:5:70. To this electrolyte, the additive components were added at specified weight percentages.

The sealed NMC/graphite cells used a positive electrode made of NMC532 with micrometer-sized grains (sometimes referred to as single-crystal NMC532), and a negative electrode made of artificial graphite, unless otherwise specified. To test certain battery systems, other positive, including standard NMC532 (with smaller grains than the NMC with micrometer-sized grains) and NMC622, and negative electrodes (including natural graphite) were used.

Before electrolyte filling, the sealed cells were cut open below the heat seal and dried at 100° C. under vacuum for 12 hours to remove any residual water. Then the cells were transferred immediately to an argon-filled glove box for filling and vacuum sealing and then were filled with electrolyte. After filling, cells were vacuum-sealed.

After sealing, the sealed cells were placed in a temperature box at 40.0 +/−0.1° C. and held at 1.5 V for 24 hours to allow for the completion of wetting. Then, sealed cells were subjected to the formation process. Unless specified otherwise, the formation process for NMC/graphite cells consisted of charging the sealed cells at 11 mA (C/20) to 4.2 V and discharging to 3.8 V. C/x indicates the that the time to charge or discharge the cell at the current selected is x hours when the cell has its initial capacity. For example, C/20 indicates that a charge or discharge would take 20 hours. After formation, cells were transferred and moved into the glove box, cut open to release any generated gas and then vacuum sealed again and the appropriate experiments were performed.

The formation process for the Panasonic 1030 cells for the cycling and storage experiments consisted of charging the sealed cells at C/2 at 40° C. for one hour; storing the cells at 60° C. for 22 hours; charging the cells to 4.2 V and discharging to 3.8 V at C/2 at 40° C. After formation, cells were transferred and moved into the glove box, cut open to release any generated gas and then vacuum sealed again and the appropriate experiments were performed.

The formation process for the Panasonic 1030 cells for the charging and profile and gas volume measurement experiments consisted of charging the sealed cells at C/20 at 40° C. for one hour; storing the cells at 60° C. for 22 hours; charging the cells to 4.2 V and discharging to 3.8 V at C/20 at 40° C. After formation, cells were transferred and moved into the glove box, cut open to release any generated gas and then vacuum sealed again and the appropriate experiments were performed.

Charging Profile and Gas Volume Measurements

The formation process is performed prior to cells being used in their intended application, such as grid storage or energy storage in an automobile, such as an electric vehicle. During formation, cells are subject to a precisely controlled charge and discharge cycle, which is intended to activate the electrodes and electrolyte for use in their intended application. During formation, gas is generated. If sufficient amounts of gas are generated (depending on the specific tolerances allowed by the cell and cell packaging), the gas may need to be released after the formation process and prior to application use. This typically requires the additional steps of breaking of a seal followed by a resealing. While these steps are common for many battery systems, it is desirable to remove them if possibly by choosing a system that produces less gas.

Gas volume experiments proceeded as follows: Ex-situ (static) gas measurements were used to measure gas evolution during formation and during cycling. The measurements were made using Archimedes' principle with cells suspended from a balance while submerged in liquid. The changes in the weight of the cell suspended in fluid, before and after testing are directly related to the volume changes by the change in the buoyant force. The change in mass of a cell, $\Delta m$, suspended in a fluid of density, $\rho$, is related to the change in cell volume, $\Delta v$, by $\Delta v = -\Delta m/\rho$. The gas generated during charge-discharge and during high potential hold periods was measured using the in-situ gas measuring device described by Aiken et al. (C. P. Aiken, J. Xia, David Yaohui Wang, D. A. Stevens, S. Trussler and J. R. Dahn, J. Electrochem. Soc. 2014 volume 161, A1548-A1554).

Figures 5A, 5B, 5C:
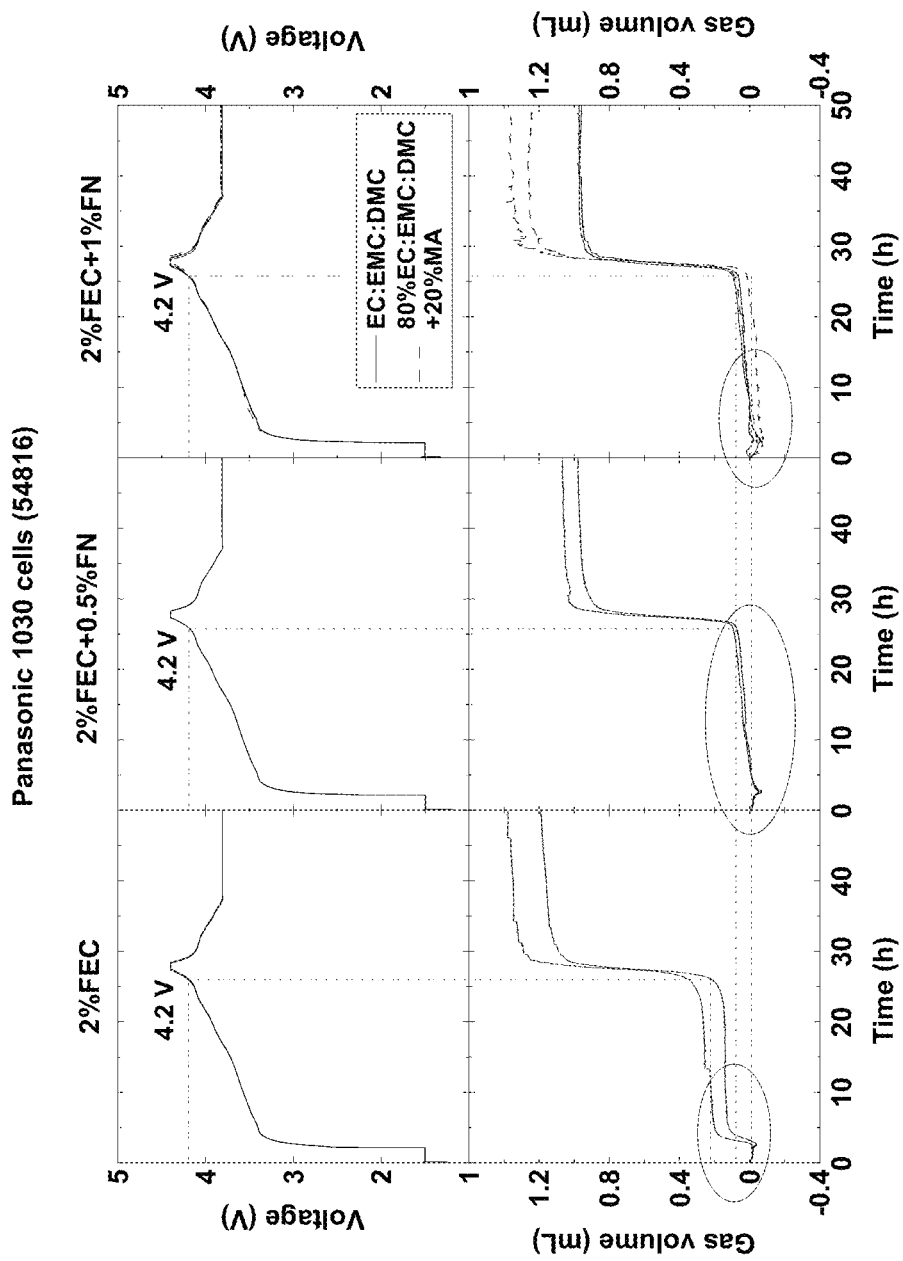
FIGS. 5A-5C illustrate the charging profile and gas formation of various electrolytes.

In certain embodiments, two-additive electrolyte systems, the concentration of each additive about 0.25-6%, form part of the battery system. FIGS. 5A-5C illustrate the charging profile and gas formation of various electrolytes as tested in Panasonic 1030 cells.

As shown in FIGS. 5A-5C, the charging profile of the battery cell is independent of the additive present in the electrolyte composition. Moreover, as illustrated by FIG. 5C the charging profile of an electrolyte composition comprising EC:EMC:DMC is similar to the charging profiled of an electrolyte composition comprising 80% EC:EMC:DMC+ 20% MA, indicating that the charging profile is independent of the electrolyte composition itself.

FIGS. 5A-5C also illustrate the gas formation in various electrolyte systems. The inventors, surprisingly, discovered that the presence of FN in an electrolyte composition significantly suppresses gas generation during cell formation compared to an electrolyte composition comprising only 2% FEC as an additive. The suppression of gas generation observed after the addition of FN is not related to the amount of FN, provided there is at least 0.5% FN present, as illustrated by FIGS. 5B-5C. Negligible amounts of gas were generated in an electrolyte composition containing 2% FEC+0.5% FN as additives (FIG. 5B) as well as in a cell containing 2% FEC+1% FN as additives (FIG. 5C). As also illustrated in FIG. 5C, the suppression of gas generation is independent of the primary component of the electrolyte composition. The negligible amount of gas generation was not affected by the addition of 20% MA to the electrolyte composition. As a result of this unexpectedly superior effect of FN-containing electrolyte compositions, which leads to significant reduction of gas generation during the formation process, the manufacturing process of battery systems can be made more efficient and cost effective by eliminating a post-formation gas release step. The post-formation gas release step generally requires unsealing and resealing of a battery system, which increases the manufacturing time, and reduces efficiency due to potential solvent evaporation.

Passivation Impact

Figure 6A:
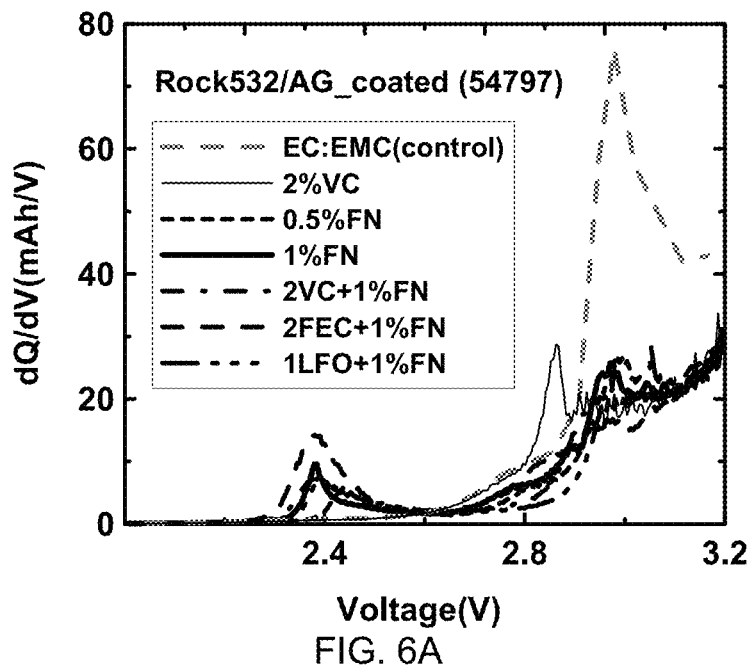
FIGS. 6A-6B illustrate the passivation impact of various electrolyte compositions in different types of cells.
Figure 6B:
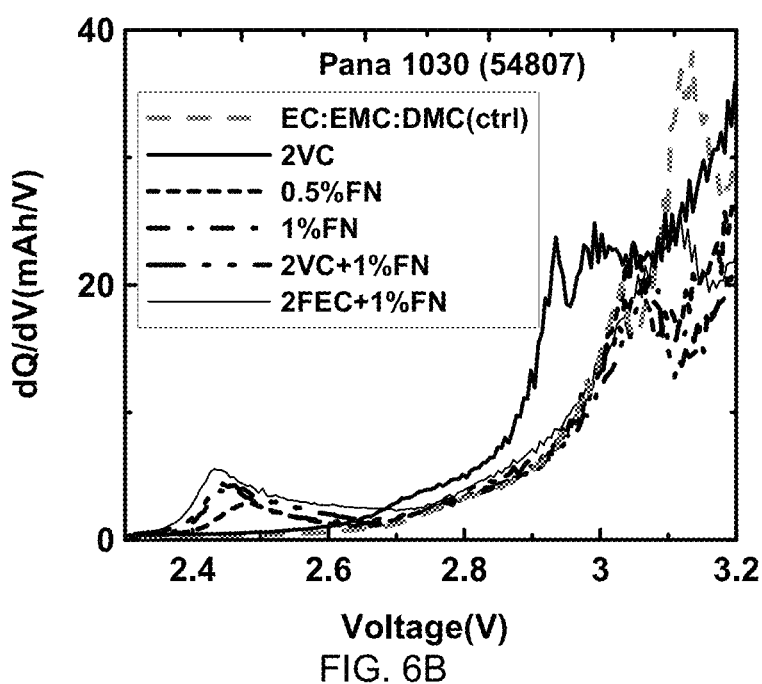

The passivation impact of various electrolyte compositions in different types of cells is illustrated in FIGS. 6A-6B where the differential capacity (dQ/dV) is plotted versus cell voltage during the formation charge. As seen from the data in FIGS. 6A-6B, FN shows a passivation peak at 2.4V, which dominates the contribution from VC and EC at 2.85V and 3V, respectively. FIG. 6A illustrates the passivation impact of ethylene carbonate (EC):ethyl methyl carbonate (EMC) (control), and EC:EMC with 2% VC, 0.5% FN, 1% FN, 2% VC+1% FN, 2% FEC+1% FN, and 1% LFO and 1% FN in a cell with a coated NMC532 positive electrode and an artificial graphite negative electrode. FIG. 6B illustrates the passivation impact of ethylene carbonate (EC):ethyl methyl carbonate (EMC) (control), and EC:EMC with 2% VC, 0.5% FN, 1% FN, 2% VC+1% FN, and 2% FEC+1% FN in a Panasonic 1030 cell.

Cell Impedance

The two-additive electrolyte systems and novel battery systems disclosed herein have low cell impedance. Minimizing cell impedance is desirable since cell impedance decrease the energy efficiency of a cell. Conversely, low impedance leads to a higher charging rate and higher energy efficiency.

Cell impedance was measured using electrochemical impedance spectroscopy (EIS). The sealed cells used a single-crystal NMC532 positive electrode and an artificial negative electrode unless stated otherwise, with the EIS measurements performed after formation. Cells were charged or discharged to 3.80 V before they were moved to a 10.0 +/−0.1° C. temperature box. AC impedance spectra were collected with ten points per decade from 100 kHz to 10 mHz with a signal amplitude of 10 mV at 10.0 +/−0.1° C. In certain embodiments, two-additive electrolyte systems, the concentration of each additive about 0.25-6%, form part of the battery system.

Figure 7A:
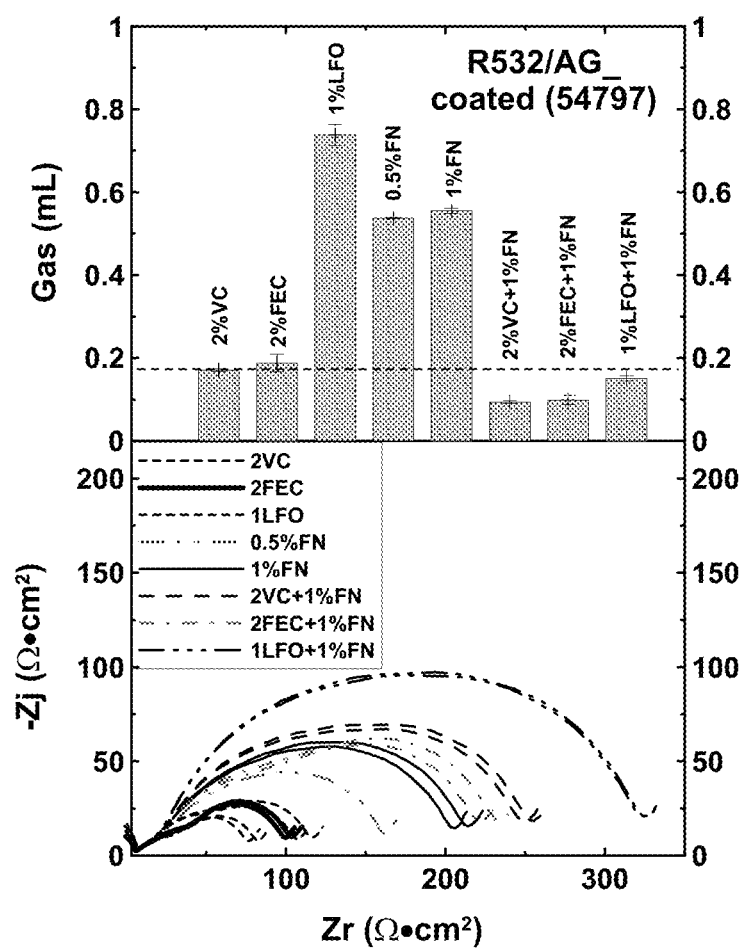
FIGS. 7A-7B illustrate the Electrochemical Impedance Spectroscopy (EIS) spectra of, and gas formation in, various electrolyte compositions in different types of cells.
Figure 7B:
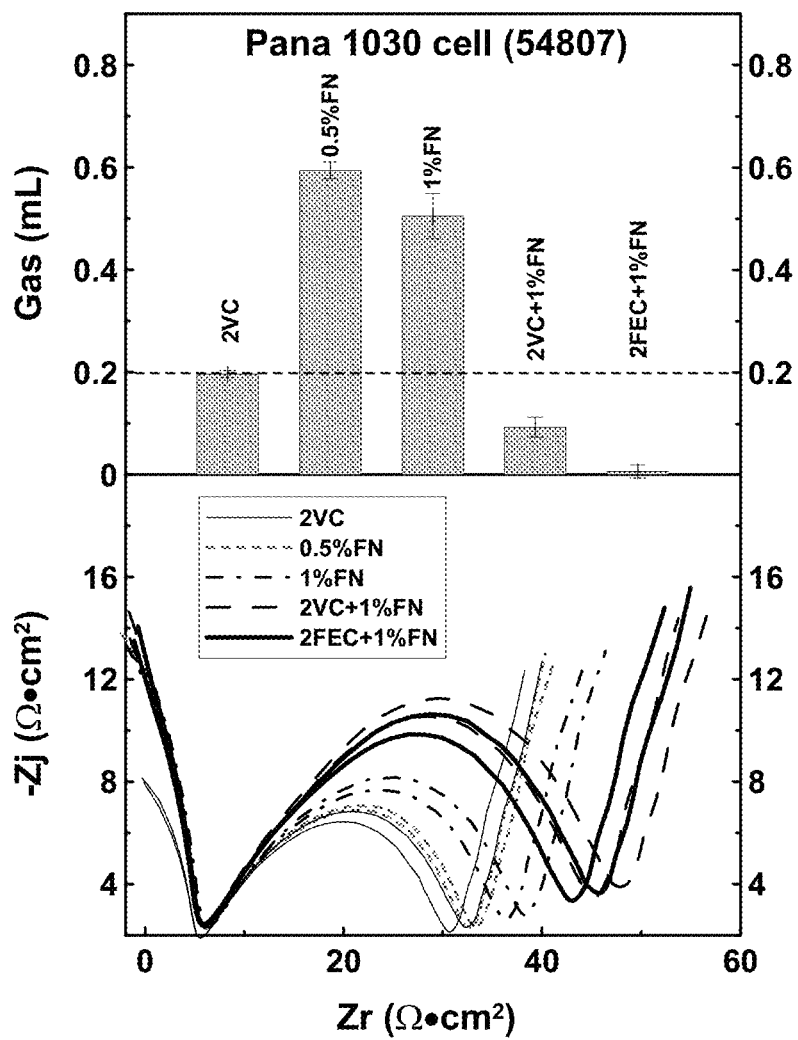

The effect of FN on impedance is illustrated in FIGS. 7A-7B, which is generally higher than the impedance in cells that do not include FN in the electrolyte composition. However, the advantages associated with the significantly low (FIG. 7A) or negligible (FIG. 7B) gas generation during the formation process outweighs any increase in the impedance observed for cells that include FN as an additive in the electrolyte composition Ultrahigh Precision Cycling and Storage Experiments To study the effectiveness of the battery systems of the present disclosure, including the operative electrolyte additives and electrodes, ultrahigh precision cycling (UHPC) was performed. The standard UHPC procedure consisted of cycling cells at 4.3 V at 40° C. using a current corresponding to C/3 to produce the data. UPHC is employed to measure the coulombic efficiency, charge endpoint capacity slippage and other parameters to an accuracy of 30 ppm, in the case of the coulombic efficiency. Details of the UHPC procedure are described in T. M. Bond, J. C. Burns, D. A. Stevens, H. M. Dahn, and J. R. Dahn, *Journal of the Electrochemical Society*, 160, A521 (2013), which is incorporated herein in its entirety.

Metrics measured and/or determined from the UHPC measurements of particular interest include the following: coulombic efficiency, normalized coulombic inefficiency, normalized charge endpoint capacity slippage, normalized discharge capacity (or fade rate), and delta V. Coulombic efficiency is the discharge capacity ($Q_d$) divided by charge capacity ($Q_c$) of the previous cycle. It tracks the parasitic reactions happening at the in the Li-ion cell and includes contributions from both the positive and negative electrodes. A higher CE value indicates less electrolyte degradation in the cell. Coulombic inefficiency per hour (CIE/h) is a normalized (per hour) coulombic inefficiency where the coulombic inefficiency is defined as 1-CE. It is calculated by taking 1-CE and dividing by the time of the cycle for which the CE was measured. Charge endpoint capacity motion (or slippage) tracks the parasitic reactions occurring at the positive electrode as well as the positive material mass loss, if any. Less motion is better and relates to less electrolyte oxidation. Normalized discharge capacity, or fade rate, is another important metric, with a lower fade rate desirable and normally indicative of a battery system with a longer lifetime. ΔV is calculated as the difference between the average charge voltage and average discharge voltage. ΔV change relates closely to polarization growth with lower ΔV change as cycling occurs is preferable. UHPC measurements are particularly appropriate for comparing electrolyte compositions because it allows for the tracking of metrics with a higher accuracy and precision and allows for the evaluation of various degradation mechanisms in a relatively rapid fashion.

In certain embodiments, two-additive electrolyte systems, the concentration of each additive about 0.25-6%, form part of the battery system. The battery systems may also include positive electrodes made from NMC111, NMC532, NMC811, NMC622, or another NMC composition (NMCxyz). In certain embodiments, positive electrodes made from NMC532 with micrometer-scale grains have been shown to be particularly robust, in part because processing conditions created larger grain sizes than typically processing conditions create.

Typical processing conditions lead to NMC electrodes with nanometer-sized particles packed into larger micrometer-sized agglomerates, creating grain boundaries on the nanometer scale. Grain boundaries are defects that tend to reduce desirable properties (for example, electrical properties), so it is typically desirable to reduce the number of grains and increase the grain size. Current processing can create larger domains, on the micrometer size scale, thereby reducing the number of grain boundaries in the NMC electrodes, increasing electrical properties. The increase in properties is results in more robust battery systems. In certain embodiments, other NMC electrodes may be processed to create larger domain sizes (on the micrometer-size scale or larger), for example, NMC111, NMC811, NMC622, or another NMC compound to create more robust systems.

In certain embodiments, a Panasonic 1030 cell containing NCA and graphite-SiO electrodes was used.

Long Term Cycling

Lifetime of a battery system is an important property of a battery system. Charging and discharging rates can affect lifetime. Long term cycling experiments help determine how resilient battery systems are over time under anticipated operation conditions. It is important to select battery systems that have sufficient lifetimes for the desired application.

Embodiments of the present disclosure exhibit desirable long term cycling for different applications, including grid and vehicle storage.

Specifically, two-additive electrolyte systems of VC+FN and FEC+FN, in which EC is used as a solvent, are particularly relevant for automobile applications (especially energy storage within an electric vehicle) in which charging and discharging rates are typically higher than for grid-storage applications.

In the long-term-cycling experiments, single-crystal NMC532 was typically used as the positive electrode (unless otherwise specified) and artificial graphite was used as the negative electrode (unless otherwise specified). In another embodiment, Panasonic 1030 cells were used. Before the long term cycling experiments, sealed cells were subjected to the formation process, as described above. Generally, cells are transferred and moved into the glove box after the formation process, cut open to release gas generated during the formation process, and then vacuum sealed again. However, this additional step was not required for cells containing FN as an additive due to negligible gas generation during cell formation. After formation, cells were cycled on a Neware charging systems. Cells were housed in a temperature controlled box at 40° C. +/−0.2° C. or 20° C. +/−0.2° C. The cells were cycled between 3.0 V and the top of charge (4.2 V or 4.3 V) with a current of C/3 (half cycle of 3 h) and a constant voltage step at the top of charge until the current dropped below C/20. Every 50 cycles, cells underwent one full cycle at C/20.

Figure 8A:
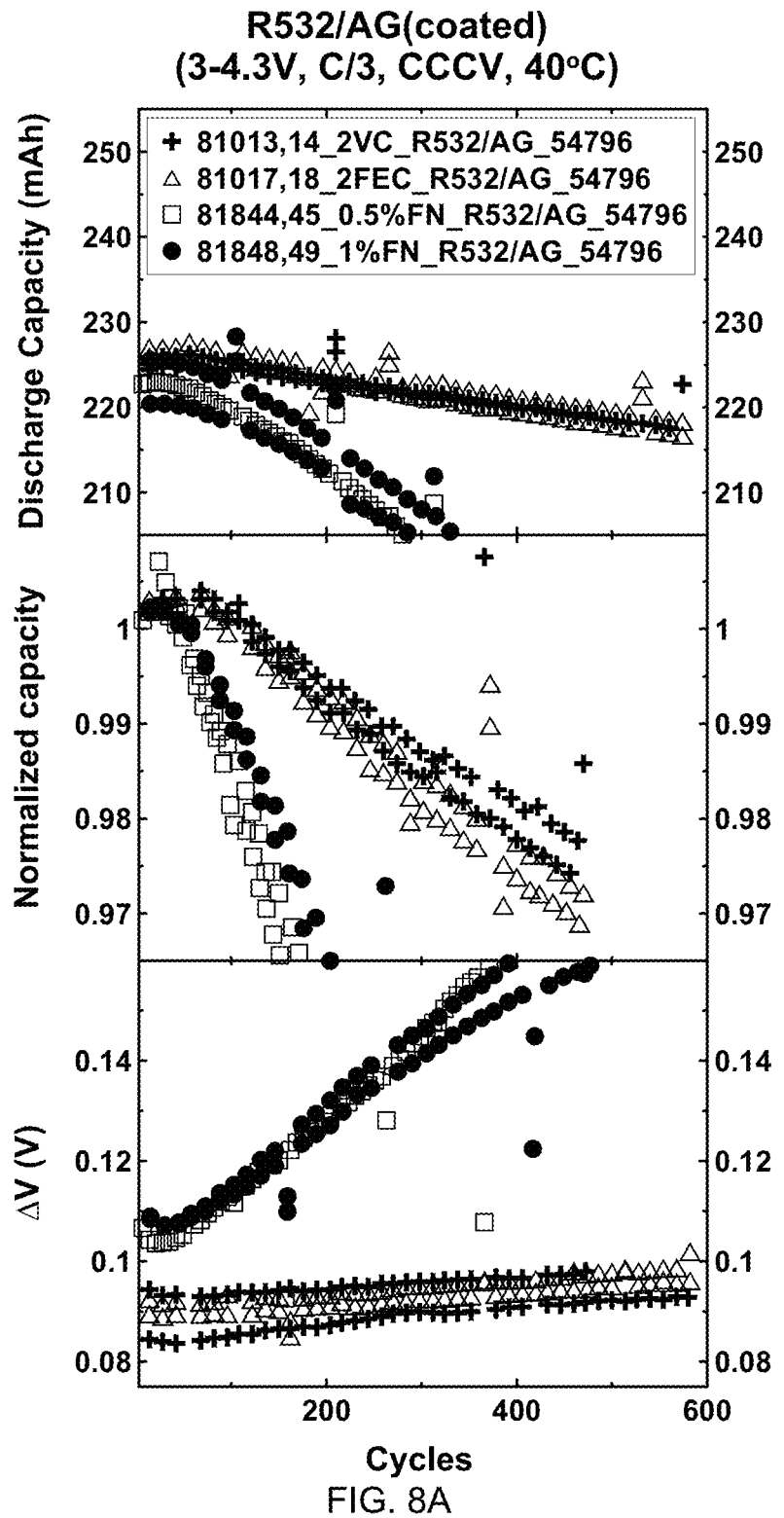
FIGS. 8A-8E illustrate typical experimental data studying long term cycling at 40° C., C/3 CCCV showing the advantages of including FN as an additive to an electrolyte system containing VC or FEC.
Figure 8B:
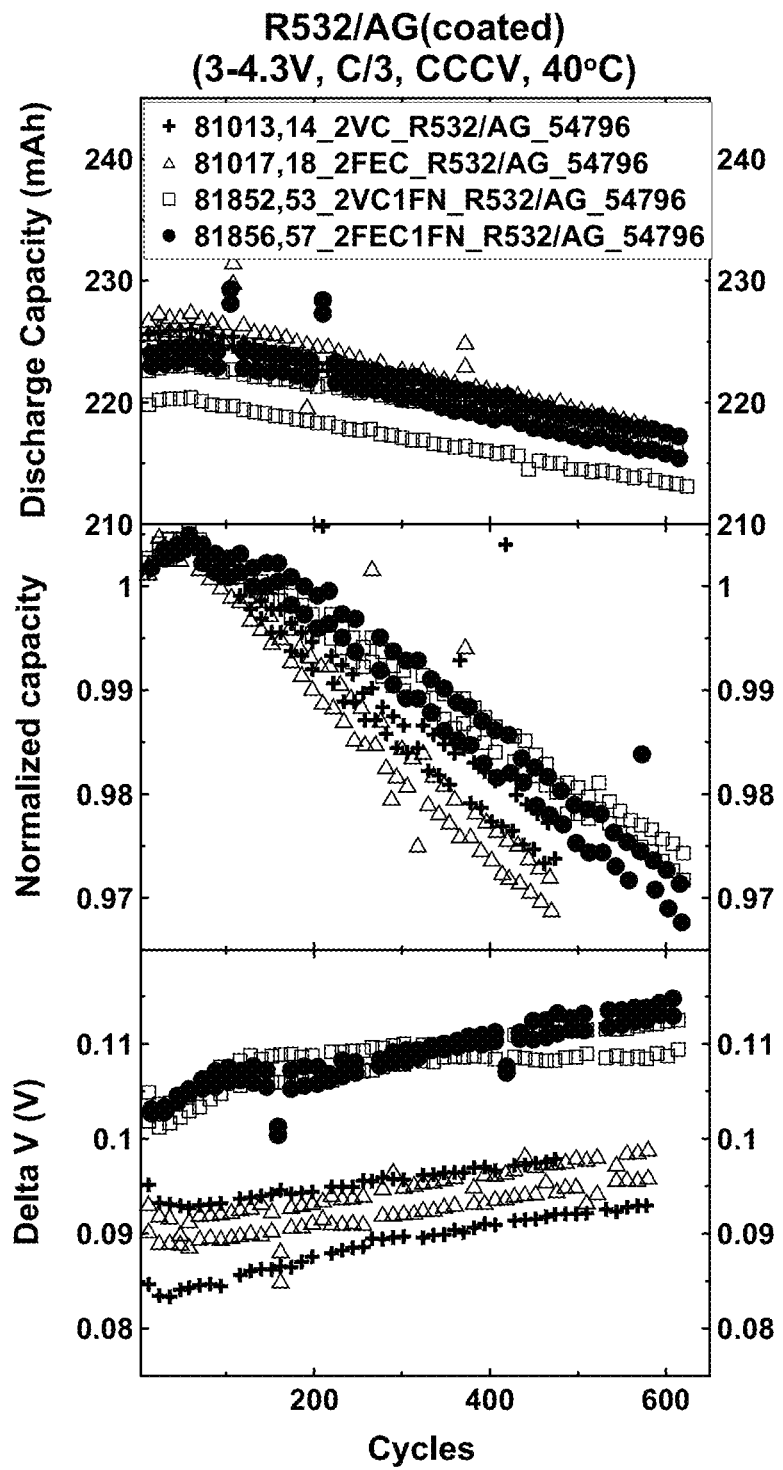
Figure 8C:
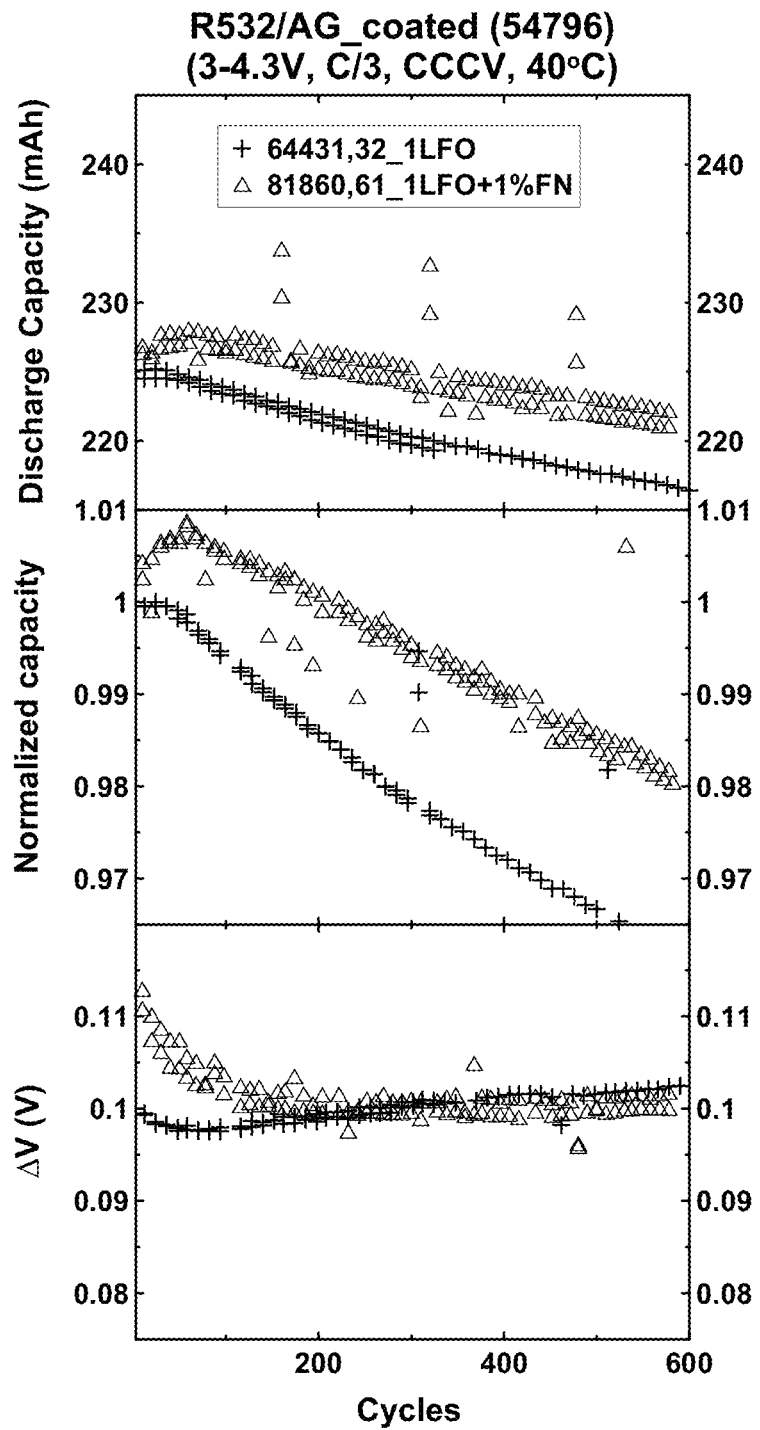
Figure 8D:
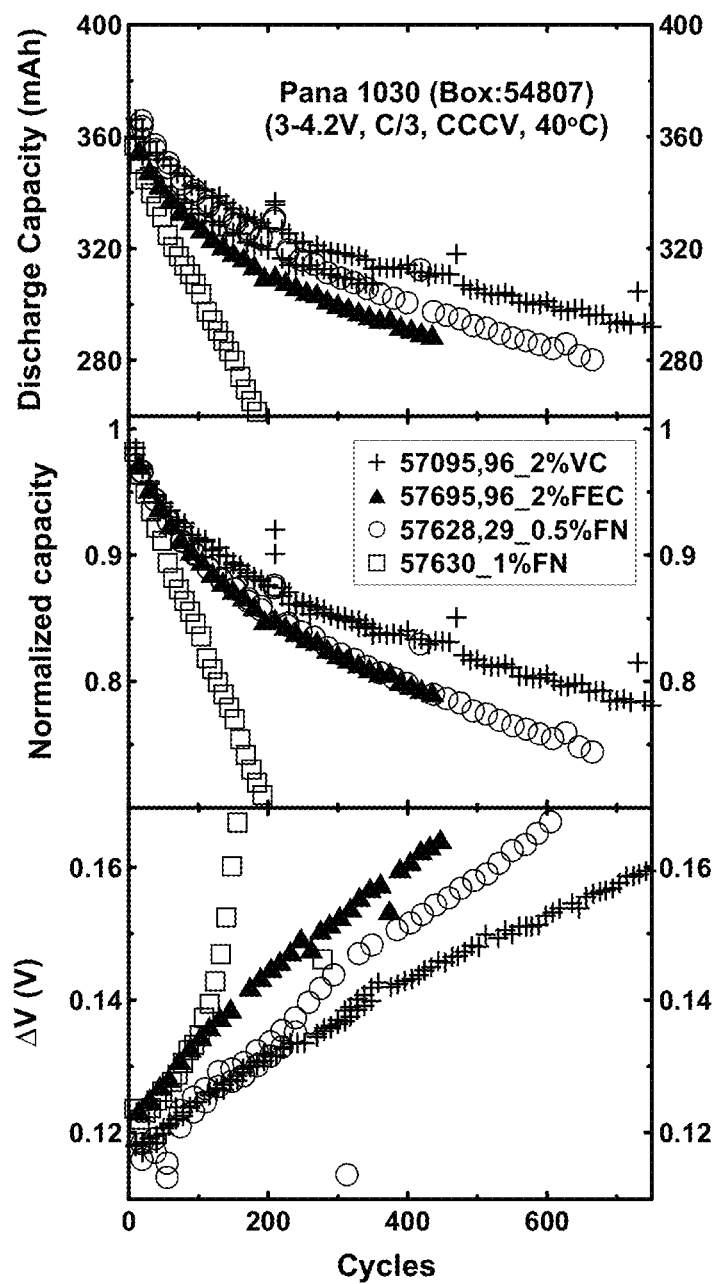
Figure 8E:
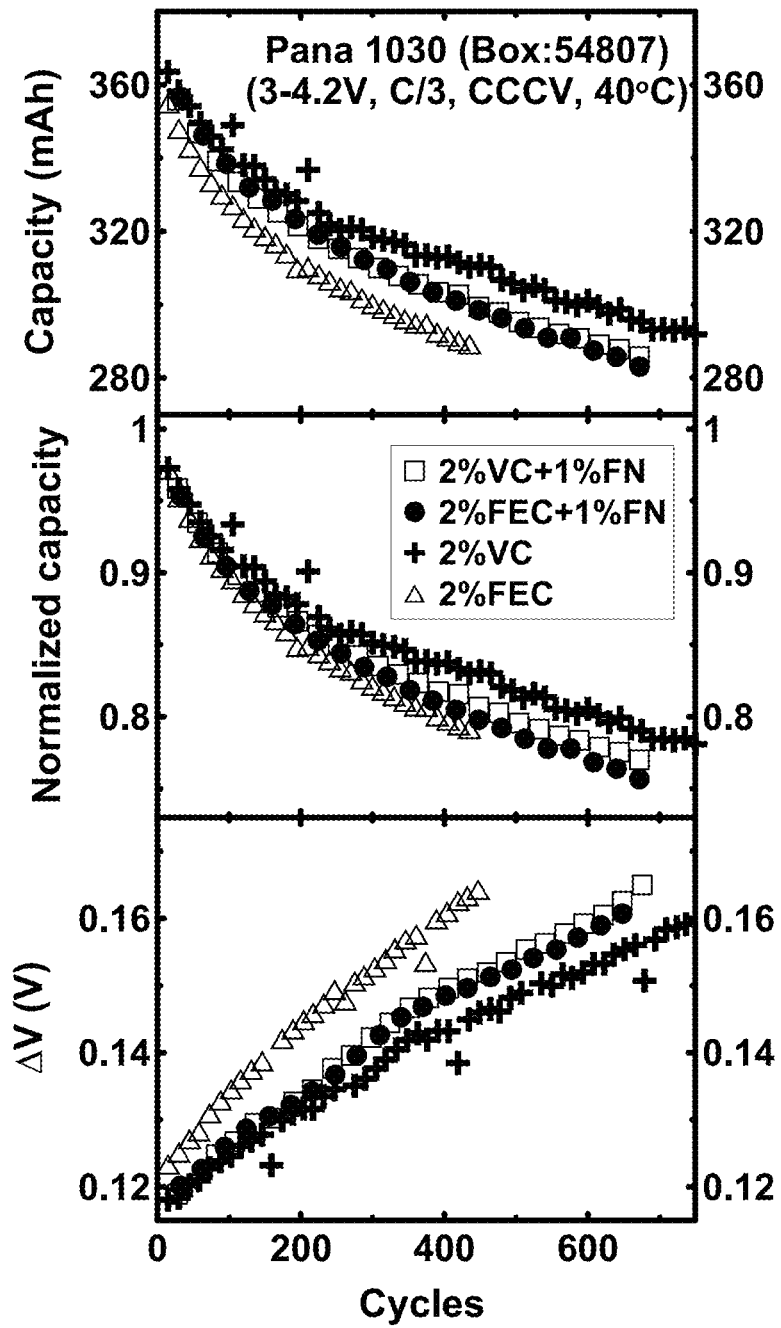

In certain embodiments, two-additive electrolyte systems, the concentration of each additive about 0.25-6%, form part of the battery system. FIGS. 8A-8E illustrate typical experimental data studying long term cycling at 40° C., C/3 CCCV showing the advantages of including FN as an additive to an electrolyte system containing VC or FEC. The long-term cycling results using a coated NMC 532 as the positive electrode and an artificial graphite negative electrode as illustrated in FIGS. 8A-8C, and the long-term cycling results using a commercially available Panasonic 1030 cell are illustrated in FIGS. 8D-8E. As shown in these figures, the addition of FN to the electrolyte composition does not strongly affect the long-term cycling properties of the battery system. In combination with the significant reduction in gas generation during the formation process, battery systems comprising FN as additive sometimes have unexpectedly superior properties (see FIG. 8C) compared to standard battery systems.

The foregoing disclosure is not intended to limit the present disclosure to the precise forms or particular fields of use disclosed. As such, it is contemplated that various alternative embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims. Reference to additives in the specification are generally to operative additives unless otherwise noted in the specification.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed battery system. It is to be understood that the forms of disclosure herein shown and described are to be taken as representative embodiments. Equivalent elements, or materials may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Reference to "about" or "approximately" is to be construed to mean plus or minus 10%. Similarly, reference to any percentage of an additive is construed to mean plus or minus 10%.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. A method of preparing a battery system comprising a sealed cell, the method comprising:
   assembling a positive electrode and a negative electrode in the sealed cell;
   removing residual water from the sealed cell;
   filling the sealed cell with a nonaqueous electrolyte under an inert atmosphere;
   vacuum-sealing the sealed cell;
   carrying out a formation process comprising charging and discharging the sealed cell until the sealed cell achieves an initial specified capacity,
   wherein the nonaqueous electrolyte comprises:
      lithium ions;
      a first nonaqueous solvent comprising a carbonate solvent;
      a second nonaquaeous solvent comprising methyl acetate; and
      an additive mixture of a first operative additive comprising fluoroethylene carbonate and a second operative additive comprising 2-furanone having the following formula (I):

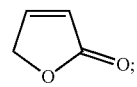

wherein the concentrations of each of the first nonaqueous solvent and the second nonaqueous solvent are greater than 6% by weight;
      wherein the concentration of the first operative additive is in a range from 0.25% to 6% by weight; and
      wherein the concentration of the second operative additive is in a range from 0.1% to 5% by weight;
   wherein gas generation during the formation process is suppressed by at least 50% compared with gas generation during a formation process of a battery system comprising only the first operative additive.

2. The method according of claim 1, wherein gas formation is suppressed in the battery system during the formation process.

3. The method according of claim 1, wherein the method does not include a gas release step after the formation process.

4. The method of claim 1, wherein removing residual water from the sealed cell comprises opening the sealed cell below a heat seal and drying at 100° C. under vacuum for 12 hours.

5. The method of claim 1, wherein gas generation is completely suppressed during the formation process.

6. The method of claim 1, wherein the battery system has a capacity retention comparable to a battery system comprising only the first operative additive.

7. The method of claim 1, wherein the concentration of the first operative additive is 2% by weight, and the concentration of the second operative additive is from 0.5% to 1% by weight.

8. The method of claim 1, wherein the first nonaqueous solvent is a carbonate solvent.

9. The method of claim 8, wherein the first nonaqueous solvent is at least one selected from ethylene carbonate, ethyl methyl carbonate and dimethyl carbonate.

10. The method of claim 1, wherein the second nonaqueous solvent is methyl acetate.

11. The method of claim 1, wherein the positive electrode comprises a lithium nickel manganese cobalt oxide (NMC).

12. The method according to claim 1, wherein the negative electrode comprises an anode active material selected from artificial graphite, natural graphite, and graphite/SiO blends.

13. The method of claim 1, wherein the first operative additive is fluoroethylene carbonate.

14. The method of claim 1, wherein the first operative additive further comprises vinylene carbonate.

15. A method of preparing a battery system comprising a sealed cell, the method comprising:
   assembling a positive electrode and a negative electrode in the sealed cell;
   removing residual water from the sealed cell;

filling the sealed cell with a nonaqueous electrolyte under an inert atmosphere;
vacuum-sealing the sealed cell;
carrying out a formation process comprising charging and discharging the sealed cell until the sealed cell achieves an initial specified capacity,
wherein the nonaqueous electrolyte comprises:
lithium ions;
a first nonaqueous solvent comprising a carbonate solvent;
a second nonaqueous solvent comprising methyl acetate; and
an additive mixture of fluoroethylene carbonate and a 2-furanone having the following formula (I):

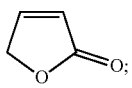
(I)

wherein the concentration of the fluoroethylene carbonate is about 2% by weight; and
wherein the concentration of the 2-furanone is about 0.5% by weight.

16. The method according to claim 15, wherein the concentrations of each of the first nonaqueous solvent and the second nonaqueous solvent are greater than 6% by weight.

* * * * *

UNITED STATES PATENT AND TRADEMARK OFFICE
CERTIFICATE OF CORRECTION

PATENT NO. : 11,824,160 B2
APPLICATION NO. : 16/028041
DATED : November 21, 2023
INVENTOR(S) : Jeffery R. Dahn et al.

It is certified that error appears in the above-identified patent and that said Letters Patent is hereby corrected as shown below:

In the Claims

In Column 16, Claim 1, Line 1, delete "nonaquaeous" and insert --nonaqueous--.

Signed and Sealed this
Twelfth Day of March, 2024

Katherine Kelly Vidal
*Director of the United States Patent and Trademark Office*